J. MILLS.
GATE.
APPLICATION FILED APR. 17, 1911.
1,018,515.
Patented Feb. 27, 1912.
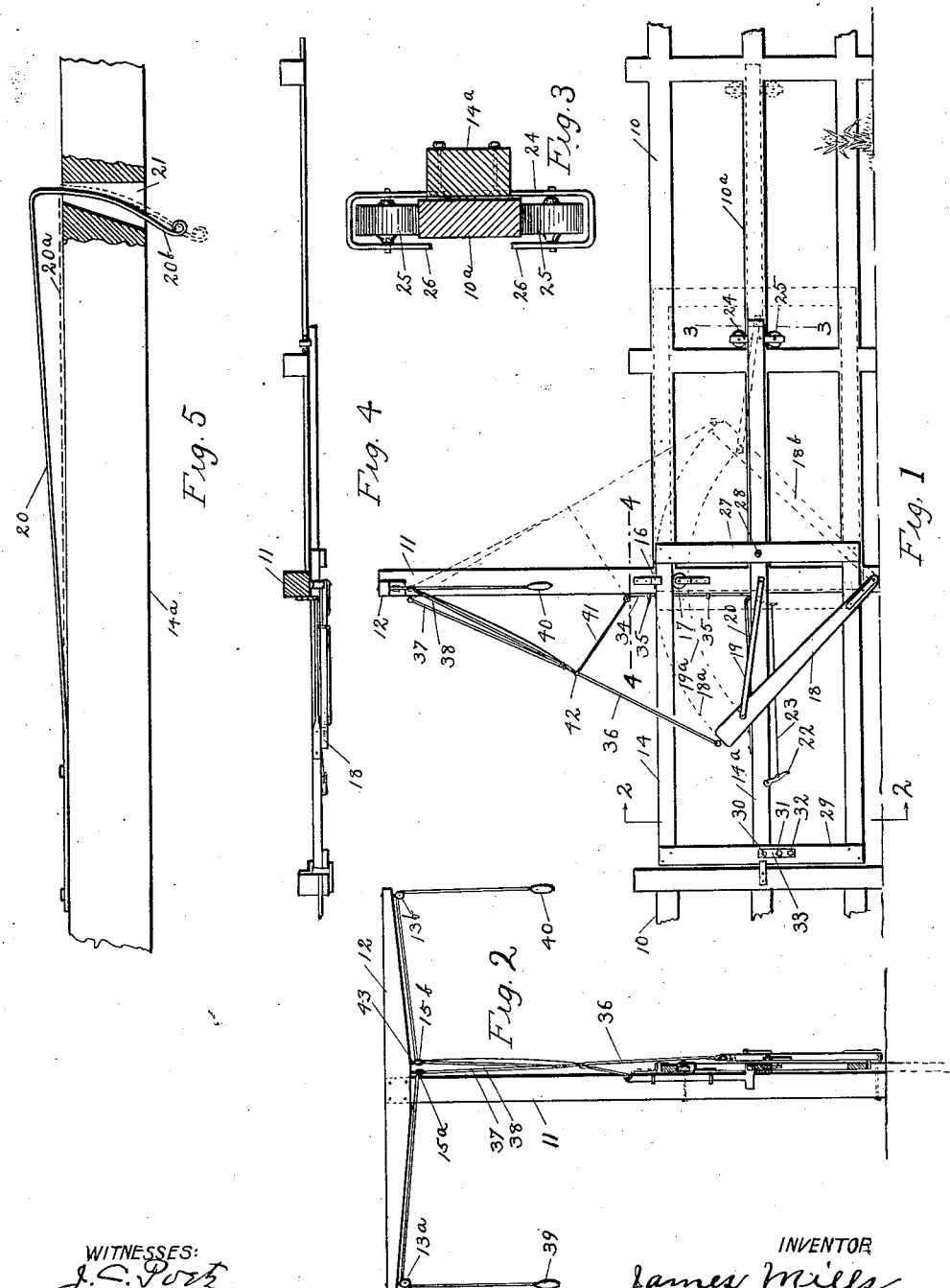

UNITED STATES PATENT OFFICE.

JAMES MILLS, OF SPOKANE, WASHINGTON.

GATE.

1,018,515.   Specification of Letters Patent.   Patented Feb. 27, 1912.

Application filed April 17, 1911. Serial No. 621,733.

*To all whom it may concern:*

Be it known that I, JAMES MILLS, citizen of the United States of America, residing at Spokane, in the county of Spokane and State of Washington, have invented certain new and useful Improvements in Gates, of which the following is a specification.

This invention pertains to gates and has for its object, to provide a gate that may be readily opened by a person either riding or walking, that will automatically latch as the gate is shut and unlock as the gate is opened, and one that may be elevated to permit of hogs or other small animals passing under. I accomplish these purposes by the mechanism disclosed in the accompanying drawings in which—

Figure 1, is an elevation of the gate together with the mechanism for its adjustment and the portions of a fence immediately connected therewith, Fig. 2, is an end elevation of the same, with, however, the gate sectioned on the line 2—2 of Fig. 1. Fig. 3, is an enlarged sectional view taken on the line 3—3 of Fig. 1. Fig. 4, is a top plan view of the gate and mechanism from the line 4—4 downward, and Fig. 5, is an enlarged detail view of the gate catch together with a broken away portion of the plank to which the same is attached.

In line with the fence 10 and centrally located in relation to the gate mechanism is a post 11 of unusual height, to which is secured at the top thereof a cross arm 12 carrying at its ends the pulleys $13^a$ and $13^b$ and near the center thereof and above the gate 14, the pulleys $15^a$ and $15^b$ attached to the post 11 near the center thereof and adapted to loosely overlap the top plank of the gate 14 is a guide 16, and on the same post beneath the top plank of the gate is secured a roller 17. To the bottom of the post 11 is fulcrumed the lever 18. An arm 19 is pivoted at one end to the lever 18 and at the other end to the central plank $14^a$ of the gate 14 near the rear thereof. To the center plank $14^a$ is also secured a catch 20, normally in the position shown in Figs. 1 and 5 and which is made of resilient material and capable of being sprung to the position shown by the dotted line $20^a$ of Fig. 5. A curved end $20^b$ of the catch 20 passes through a vertical opening 21 in the center plank $14^a$ of the gate 14. A hand lever 22 is also secured to the center plank $14^a$ of the gate 14 and is connected to the end $20^b$ of catch 20 by the rod or cord 23. The center plank $14^a$ is practically double the length of the remaining planks of the gate and has secured at the outer end thereof a bracket 24 carrying rollers 25 adapted to ride the upper and lower edges, respectively, of the center plank $10^a$ of the fence 10. The bracket 24 is bent to channel form at each end thereof where the rollers 25 are carried with the ends 26 overlapping the edges of the plank $10^a$. The plank $14^a$ is pivoted to the vertical support 27 at 28 and to the vertical plank 29 at 30, but may be pivoted at 31 or 32, the various points indicated being openings in an apertured plate 33 secured to the vertical plank 29.

Secured loosely in the guides 35 to the side of the post 11 is a latch 34 adapted for engagement with the end of the catch 20; secured to the top of the lever 18 is a cable 36 to which are attached cables 37 and 38, the cable 37 passing over pulleys $15^a$ and $13^a$ respectively and terminating at the handle 39, and the cable 38 passing over the pulleys $15^b$ and $13^b$ respectively and terminating at the handle 40. To the top of the latch 34 is secured a cable 41 which is also linked to the cable 36 as at 42 and rigidly secured to some permanent object on the crossarm 12 as at 43. The stretch of cable 41 between the points 42 and 43 may be omitted if permanently secured at 42.

When the gate is closed, the same is in the position shown in Fig. 1; when the same is open, the relative parts are in the positions shown by the dotted lines on Fig. 1, excepting that the dotted lines $18^a$ and $19^a$ indicate the paths of the lever 18 and arm 19 respectively in the passing of the gate from a closed to an open and an open to a closed position respectively. When the gate is in a closed position as shown in Fig. 1 and a person riding wishes to open the same, he draws downward on the handle 40 or 39 (connected to the cables 38 and 37 respectively) depending on which side of the gate he is on, and through the medium of the cable 36, the lever is thrown over along the path of the dotted line $18^a$ to the position of the dotted lines $18^b$, and by reason of the lever 18 being connected to the gate 14 by means of the arm 19 the gate is thrown to the position of the dotted lines shown in said Fig. 1, the relative parts being shown in the dotted lines according to their actual construction. To close the gate, draw downward on the handle (39 or 40) on the opposite side of the fence, and by the same process the gate is closed. The latch 34 operating against the end of the catch 20 locks the gate in a closed position. In the process of operating the gate as above mentioned, the cable 41 attached to the latch 34 is drawn obliquely upward and the latch 34 drawn from its locking engagement with the catch 20, and by gravity or a tension spring is drawn back to locking engagement when the gate is closed. One desiring to pass through the gate or to open it while on foot may release the catch 20 from locking engagement with the latch 34 by drawing forward on the hand lever 22 connected to the end 20ᵇ of the catch 20 whereby the same is drawn downward to the position of the dotted line 20ᵃ of Fig. 5 and the gate may be pushed open with the hands.

When it is desired to provide a passage through the gate for small animals only, the plank 14ᵃ is pivoted at 31 or 32 instead of at 30, as shown, which will have the effect of tilting the gate frame 10, resulting in the elevation of the free end of the gate.

Having thus described my invention, what I claim as new and useful and desire to secure by Letters Patent is,

In a gate mechanism having a central post with a cross-arm at the top supporting pulleys for cables used in connection with other parts to open and close the gate, a lever fulcrumed at the base of the central post and connected at its upper end to cables extending over the pulleys along the cross-arm and terminating in handles at the ends of the cross-arm, a latch slidably adjusted in guides at the side of the central post adjacent to the gate, such latch having attached thereto one end of a cable intermediately looped to the lever cables and attached at the other end rigidly to a position on the cross-arm, a catch on the gate proper brought into locking engagement with the said latch, an arm pivoted to the gate and the lever heretofore mentioned, and a bracket carrying rollers secured to a rearward extension of the gate, the rollers adapted for engagement with a plank of the fence as a guide.

In testimony whereof I affix my signature in presence of two witnesses.

JAMES MILLS.

Witnesses:
    WILLIAM H. KAYE,
    L. D. McCARTHY.

---

Copies of this patent may be obtained for five cents each, by addressing the "Commissioner of Patents, Washington, D. C."